United States Patent
Burenius

(10) Patent No.: US 9,693,017 B2
(45) Date of Patent: Jun. 27, 2017

(54) AUTOMATIC SWITCHING BETWEEN DIFFERENT CAMERAS AT A VIDEO CONFERENCE ENDPOINT BASED ON AUDIO

(71) Applicant: Cisco Technology, Inc., San Jose, CA (US)

(72) Inventor: Lennart Burenius, Oslo (NO)

(73) Assignee: Cisco Technology, Inc., San Jose, CA (US)

(*) Notice: Subject to any disclaimer, the term of this patent is extended or adjusted under 35 U.S.C. 154(b) by 367 days.

(21) Appl. No.: 14/463,826

(22) Filed: Aug. 20, 2014

(65) Prior Publication Data
US 2016/0057385 A1    Feb. 25, 2016

(51) Int. Cl.
*H04N 7/14*    (2006.01)
*H04N 7/15*    (2006.01)

(52) U.S. Cl.
CPC ............ *H04N 7/147* (2013.01); *H04N 7/142* (2013.01); *H04N 7/15* (2013.01)

(58) Field of Classification Search
CPC ....................................... H04N 7/14
USPC ......... 348/14.01, 14.08, 14.11, 14.12, 14.05, 348/14.16
See application file for complete search history.

(56) References Cited

U.S. PATENT DOCUMENTS

| | | | | |
|---|---|---|---|---|
| 5,940,118 A * | 8/1999 | Van Schyndel | ........ | H04N 7/142 348/14.05 |
| 6,707,489 B1 * | 3/2004 | Maeng | ................. | G01S 3/7864 348/14.08 |
| 6,980,485 B2 * | 12/2005 | McCaskill | ............. | H04N 7/142 348/E7.079 |
| 2005/0081160 A1 * | 4/2005 | Wee | ........................ | G06Q 10/10 715/755 |
| 2006/0104458 A1 * | 5/2006 | Kenoyer | ................... | H04N 7/14 381/92 |
| 2009/0244257 A1 * | 10/2009 | MacDonald | ............ | H04N 7/142 348/14.09 |
| 2011/0285808 A1 * | 11/2011 | Feng | ....................... | H04N 7/142 348/14.09 |

(Continued)

OTHER PUBLICATIONS

Scola, et al., "Direction of arrival estimation—A two microphones approach," Master Thesis, Blekinge Institute of Technology, Sep. 2010, 86 pages.

(Continued)

*Primary Examiner* — Olisa Anwah
(74) *Attorney, Agent, or Firm* — Edell, Shapiro & Finnan, LLC

(57) ABSTRACT

A video conference endpoint includes predefined main and side audio search regions angularly-separated from each other at a microphone array configured to transduce audio received from the search regions. The endpoint includes one or more cameras to capture video in a main field of view (FOV) that encompasses the main audio search region. The endpoint determines if audio originates from any of the main and side audio search regions based on the transduced audio and predetermined audio search criteria. If it is determined that audio originates from the side audio search region, the endpoint automatically switches from capturing video in the main FOV to one or more cameras to capture video in a side FOV that encompasses the side audio search region.

22 Claims, 6 Drawing Sheets

(56) References Cited

U.S. PATENT DOCUMENTS

| | | | |
|---|---|---|---|
| 2012/0320143 A1* | 12/2012 | Chu | H04N 7/15 |
| | | | 348/14.08 |
| 2013/0335508 A1 | 12/2013 | Mauchly | |
| 2014/0111600 A1* | 4/2014 | Schaefer | H04N 5/232 |
| | | | 348/14.08 |
| 2015/0249806 A1* | 9/2015 | Gabel | H04N 5/23296 |
| | | | 348/14.12 |
| 2015/0310260 A1* | 10/2015 | Summers | H04N 7/15 |
| | | | 382/103 |
| 2016/0134838 A1* | 5/2016 | Tangeland | H04N 5/23219 |
| | | | 348/14.09 |
| 2016/0140396 A1* | 5/2016 | Feng | G06K 9/00718 |
| | | | 348/14.08 |

OTHER PUBLICATIONS

Varma, "Time-Delay-Estimate Based Direction-of-Arrival Estimation for Speech in Reverberant Environments," Thesis submitted to the Faculty of the Bradley Department of Electrical and Computer Engineering, Virginia Polytechnic Institute and State University, Oct. 2002, 140 pages.

* cited by examiner

AUTOMATIC SWITCHING BETWEEN DIFFERENT CAMERAS AT A VIDEO CONFERENCE ENDPOINT BASED ON AUDIO

TECHNICAL FIELD

The present disclosure relates to automatic switching between different cameras in a video conference system based on audio.

BACKGROUND

A video conference system includes an endpoint that uses cameras to capture video of participants in a room and then transmits the video to a conference server or to another endpoint. Different cameras may be set-up to capture video of participants positioned in different areas of the room. Typically, an operator has to manually select which of the cameras is to capture video of talking participants (who change over time) in respective ones of the different areas. Such manual selection of different cameras to capture video of different talking participants is cumbersome and inconvenient.

DESCRIPTION OF EXAMPLE EMBODIMENTS

Overview

Techniques presented herein relate to automatic switching between different camera field-of-views (FOVs) in a video conference endpoint based on audio. The video conference endpoint includes predefined main and side audio search regions angularly-separated from each other at a microphone array configured to transduce audio received from the audio search regions. The endpoint includes one or more cameras to capture video in a main field of view (FOV) that encompasses the main audio search region. The endpoint determines if audio originates from any of the main and side audio search regions based on the transduced audio and predetermined audio search criteria. If it is determined that audio originates from the side audio search region, the endpoint automatically switches from capturing video in the main FOV to one or more cameras to capture video in a side FOV that encompasses the side audio search region.

EXAMPLE EMBODIMENTS

Figure 1:
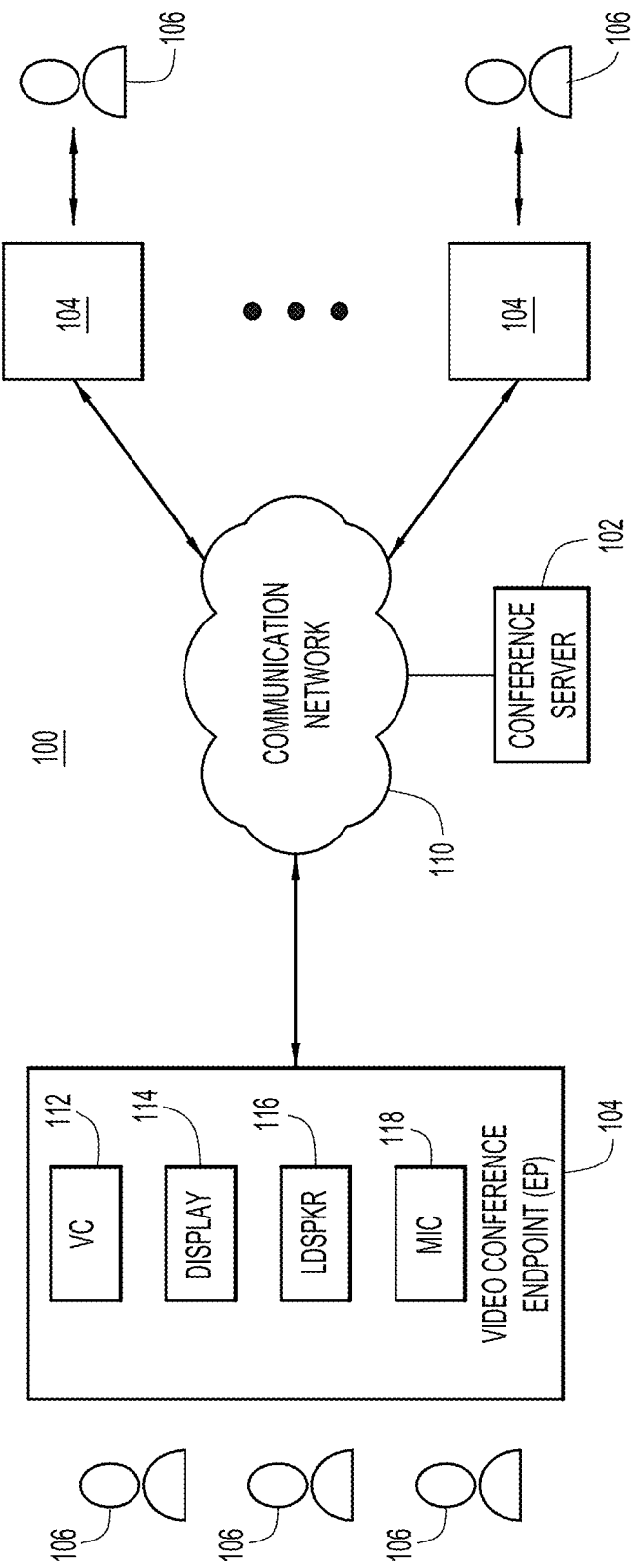
FIG. 1 is a block diagram of an example video conference (e.g., teleconference) environment in which techniques to automatically switch between different cameras (and camera field-of-views (FOVs)) based on audio may be implemented, according to an example embodiment.

With reference to FIG. 1, there is depicted a block diagram of a video conference (e.g., teleconference) environment 100 in which automatic switching between main and side camera fields of view based on audio queues may be implemented, according to an example embodiment. The main and side camera fields of view may respectively capture video of conference participants positioned opposite a display of the conference endpoint and a participant positioned adjacent or next to the same display. Video conference environment 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include multiple video cameras (VC) 112, a video display 114, a loudspeaker (LDSPKR) 116, and one or more microphones (MIC) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with microphones 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
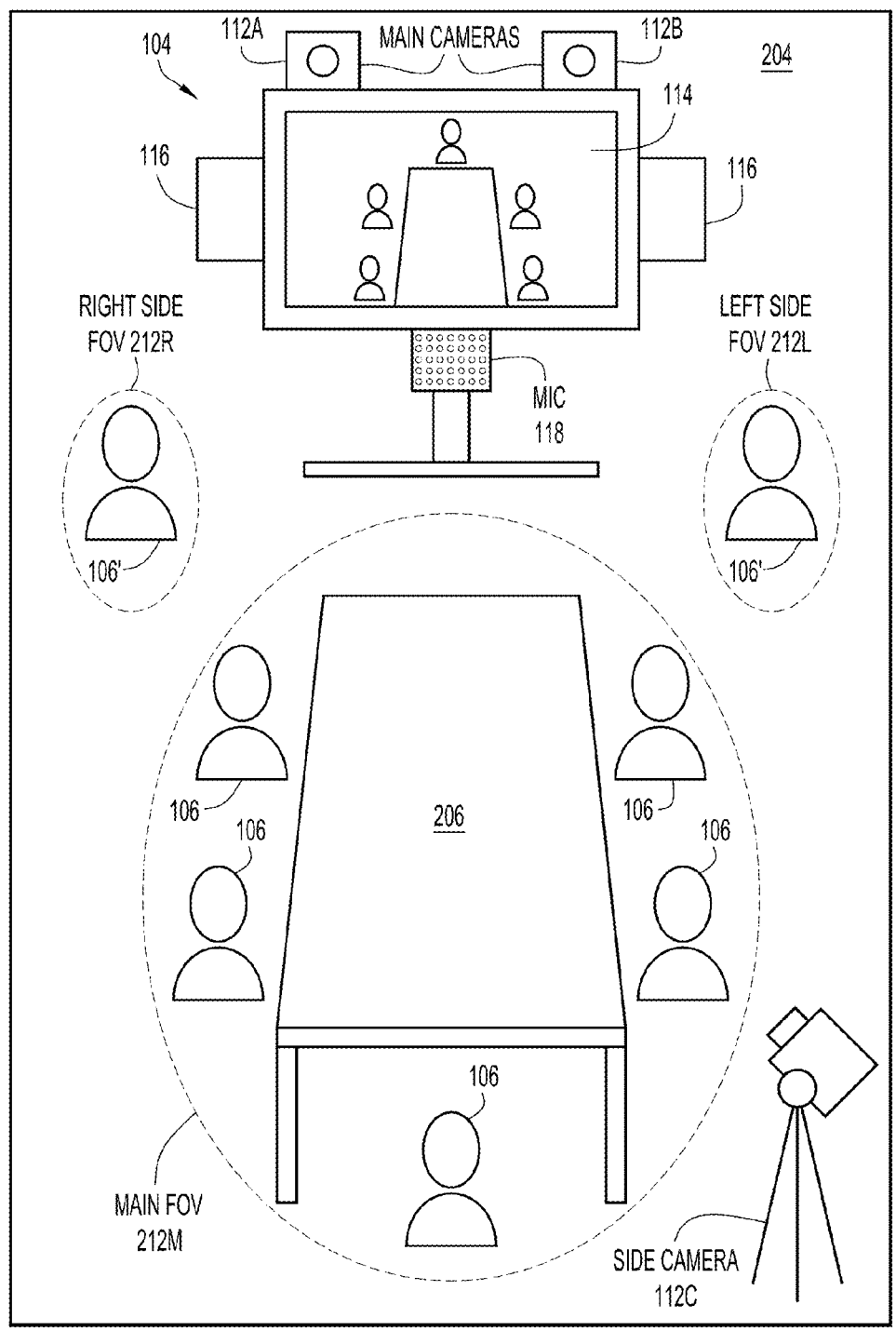
FIG. 2 is an illustration of an example video conference endpoint deployed in a conference room and configured to perform techniques presented herein, according to an example embodiment.

Referring now to FIG. 2, there is depicted an illustration of video conference endpoint 104 deployed in a conference room 204 (depicted simplistically as an outline in FIG. 2), according to an embodiment. Video conference endpoint 104 includes main or center video cameras 112A, 112B positioned proximate and centered on display 114 and a "side" video camera 112C spaced-apart from and facing cameras 112A, 112B and the display. Cameras 112A-112C (collectively referred to as "cameras 112") are each operated under control of endpoint 104, as described below. Together, main video cameras 112A and 112B establish a main or center camera field of view (FOV) 212M to selectively capture video of a scene that includes multiple participants 106 seated around a table 206 opposite from or facing (i.e., in front of) the main cameras (and display 114). On the other hand, side camera 112C establishes one or more of side camera FOVs 212R and 212L on a right-side and a left-side of display 114 to selectively capture video of one or more "side" participants 106' positioned on the left or right-side (i.e., next to) display 114. In an example application, side FOVs 212R and 212L capture/cover an area where a presenter/lecturer may be typically positioned while presenting material to the participants positioned around table 206 (in the center FOV 212M). The combination of two center video cameras and one side camera depicted in FIG. 2 is only one example of many possible camera combinations that may be used. Combinations of one main camera, multiple main cameras, one side camera, and multiple side cameras may also be used to establish the center and side field of views, as would be appreciated by one of ordinary skill in the relevant arts having read the present description.

As depicted in the example of FIG. 2, microphone array 118 is positioned adjacent to, and centered along, a bottom side of display 114 (i.e., below the display) so as to receive audio from participants 106' and 106 in room 204. In another embodiment, microphone array 118 is positioned adjacent to, and centered along, the main cameras 112A and 112B. An advantage of situating microphone array 118 vertically adjacent to the main cameras is that the array can provide more accurate sound elevation (angle) information for camera tilt-control.

Each of cameras 112 typically includes pan, tilt, and zoom (PTZ) features that may be implemented mechanically and/or digitally. Video conference endpoint 104 pans, tilts, and zooms video cameras 112 (in the mechanical or digital domain) as necessary to frame best views of the scenes encompassing participants 106 and 106' in respective main and side FOVs 212M, and 212L and 212R. In one embodiment, face detection and camera PTZ control for best view framing may be implemented at local video conference endpoint 104. In other embodiments, face detection and/or camera PTZ control may be implemented at the remote/receiving video conference endpoint, or even in the cloud (e.g., at conference server 102). Video conference endpoint 104 may use face detection techniques to detect faces and associated positions thereof of participants 106 captured in the video to facilitate optimal video framing in each of FOVs 212M, 212R, and 212L.

In accordance with techniques presented herein, endpoint 104 defines/establishes main FOV 212M, and side FOVs 212R, 212L, and automatically switches between the different FOVs in order to capture video of participants 106 and 106' therein that are actively speaking (i.e., to capture video of the active speakers in the different FOVs). That is, the automatic switching between the different FOVs is based on audio. In support of this, endpoint 104 also defines audio search regions that coincide/overlap with (i.e., are at least partially encompassed by) respective ones of FOVs 212M, 212R, and 212L. Endpoint 104 determines whether audio (e.g., voice/speech) originates from any of the search regions. If endpoint 104 determines that audio originates from one of the audio search regions, the endpoint declares this an "active" audio search region. Then, in certain cases described below, endpoint 104 automatically switches to the FOV that encompasses the active audio search region to capture video of the audio source (e.g., the talking participant). The audio search regions are now discussed in connection with FIG. 3.

Figure 3:
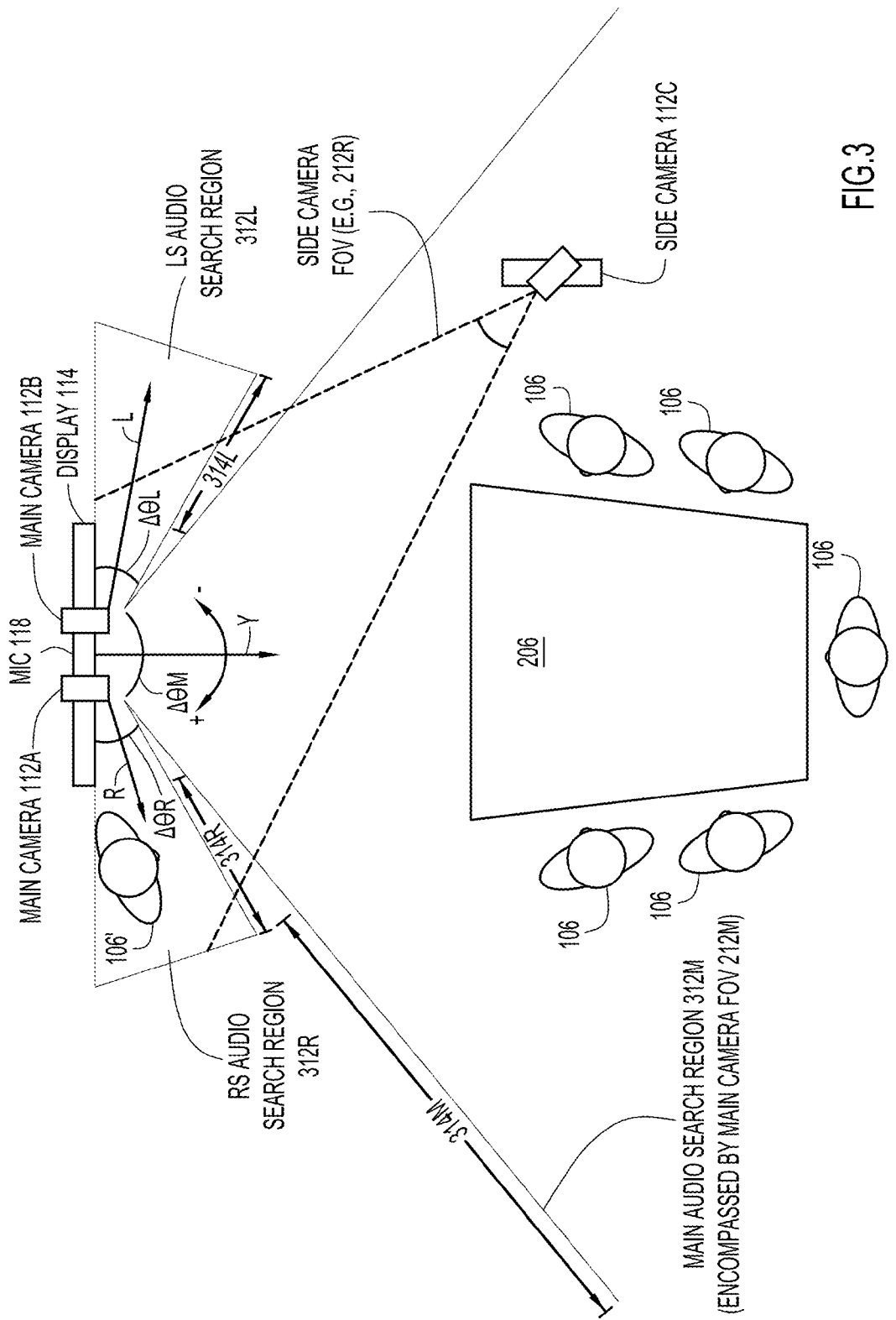
FIG. 3 is a top view of the video conference endpoint of FIG. 2 that shows example audio search regions defined by the endpoint.

With reference to FIG. 3, there is depicted a top-down view of video conference endpoint 104 (from FIG. 2) that shows example audio search regions defined by/for the endpoint. In the example of FIG. 3, endpoint 104 defines a main or center audio search region 312M, a right-side (RS) audio search region 312R, and a left-side (LS) audio search region 312L each angularly-separated from the other at microphone array 118. Audio search regions 312M, 312R, and 312L represent non-overlapping spatial regions or volumes that coincide with and overlap camera FOVs 212M, 212R, and 212L, respectively. Each camera FOV may be represented as an angle-of-view of the camera, i.e., the angle of a subject area/spatial region projected onto an image sensor of the camera, and/or a measurement of the subject area/spatial region that is imaged by the camera as a result of that angle-of-view. Each audio search region 312M, 312R, and 312L is defined by (i) an angular-range $\Delta\theta$ (which may be a solid angle) subtended at a center point of microphone array 118, and (ii) a range of distances from the microphone array, as discussed in detail below.

Main audio search region 312M is defined to be at least partially encompassed by main FOV 212M. Accordingly, main audio search region 312M is defined so as to (i) subtend a main angular-range $\Delta\theta M$ centered on a main or center axis Y that extends normally from a plane of microphone array 118, and (ii) extend over a main distance range 314M (i.e., from a minimum distance to a maximum distance) separated from the microphone array. The term "distance range separated from the microphone array" is also referred to as a "range of distances from the microphone array." An example angular-range of main angle $\Delta\theta M$ is approximately 120 degrees centered on main axis Y (e.g., +/−60 degrees from the main axis in the left/right directions); however, smaller or larger main angular-ranges are possible. An example main distance range 314M is 0.5 meters (m) to 5 m, although smaller and larger main distance ranges are possible.

Right-side audio search region 312R is defined so as to be at least partially encompassed by right-side FOV 212R. Accordingly, right-side audio search region 312R is defined to (i) subtend a right-side angular-range $\Delta\theta R$ centered on a right-side axis R angularly-separated from main axis Y (i.e., on the right-side of the main axis), and (ii) extend over a right-side distance range 314R separated from the microphone array. An example angular-range of right-side angular-range $\Delta\theta R$ is approximately 15 degrees centered on right-axis R (e.g., from +75 to +90 degrees from the normal axis); however, smaller or larger right-side angular-ranges are possible. An example right-side distance range 316 is 0.5 m to 5 m, although smaller and larger right-side distance ranges are possible.

Left-side audio search region 312L is defined so as to be at least partially encompassed by left-side FOV 212L. Accordingly, left-side audio search region 312L is defined to (i) subtend a left-side angular-range $\Delta\theta L$ centered on a left-side axis L angularly-separated from main axis Y (on the left-side of the main axis), and (ii) extend over a left-side distance range 314L separated from the microphone array. An example angular-range of left-side angular-range $\Delta\theta L$ is approximately 15 degrees centered on left-axis L (e.g., from −75 to −90 degrees from the main axis); however, smaller or larger left-side angular-ranges are possible. An example left-side distance range 314L is 0.5 m to 5 m, although smaller and larger left-side distance ranges are possible. In the example application mentioned above (regarding the side camera FOVs capturing a lecturer/presenter), the purpose of side audio search regions 312R and 312L is to cover areas where the presenter (e.g., participant 106') may typically be positioned while facing, and presenting material to, participants 106 positioned around table 206.

Endpoint 104 performs audio signal processing to "search" each of audio search regions 312M, 312R, and 312L for a source of audio therein (e.g., a talking participant) based on transduced sound from microphone array 118. Any known or hereafter developed technique to search audio search regions 312M, 312R, and 312L may be used. Generally, to perform such a search, a sound angle of arrival at microphone array 118 may be derived from transduced sound generated by spaced-apart individual microphones of the microphone array. In one example, the sound angle of arrival (SA) may be derived based on a time difference $\Delta t$ between time-of-arrivals (TOAs) of sound received at (and transduced by) the individual microphones. The sound angle of arrival SA may be determined based on the following formula: SA=arcsin(Δt*c/d), where: Δt=the TOA time difference; d=the individual microphone spacing; and c=the speed of sound in air at a given air temperature T. Additionally, a distance between a position from which the sound originates (i.e., the position of the talking participant) and microphone array 118 may also be determined based on the combination of multiple time differences Δt derived from different microphone pairs that are spatially spaced apart within the array. The determined sound angle of arrival and distance are compared against the respective angular-ranges and respective distance ranges of each of search regions 312M, 312R, and 312L. If the determined sound angle of arrival and distance both fall within one of the search regions 312M, 312R, and 312L, then that search region is considered to be a source of audio subject to further processing.

Embodiments described herein may use a planar (i.e., 2-dimensional) microphone array 118, in which case an azimuth, an elevation and a distance to a sound source based on, e.g., TOAs, as described above, may be determined. The azimuth and elevation represent an angular-range. Alternatively, embodiments may use a linear 1-dimensional microphone array, in which case only an azimuth and a distance may be determined. The azimuth represents the angular range.

Figure 4:
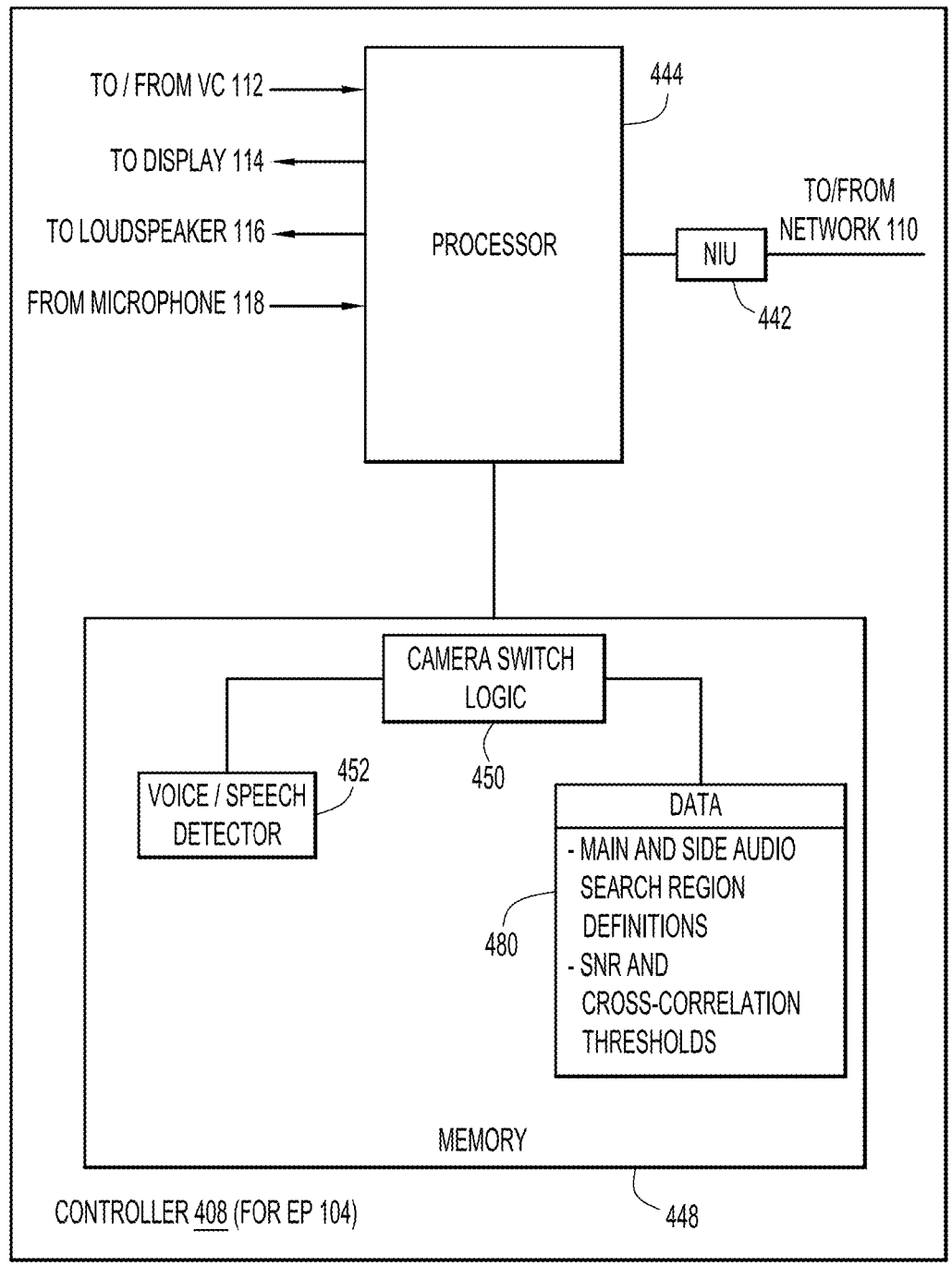
FIG. 4 is a block diagram of an example controller of the video conference endpoint configured to perform techniques described herein, according to an embodiment.

Reference is now made to FIG. 4, which shows an example block diagram of a controller 408 of video conference endpoint 104 configured to perform techniques described herein. There are numerous possible configurations for controller 408 and FIG. 4 is meant to be an example. Controller 408 includes a network interface unit 442, a processor 444, and memory 448. The network interface (I/F) unit (NIU) 442 is, for example, an Ethernet card or other interface device that allows the controller 408 to communicate over communication network 110. Network I/F unit 442 may include wired and/or wireless connection capability.

Processor 444 may include a collection of microcontrollers and/or microprocessors, for example, each configured to execute respective software instructions stored in the memory 448. The collection of microcontrollers may include, for example: a video controller to receive, send, and process video signals related to display 112 and video cameras 112; an audio processor to receive, send, and process audio signals related to loudspeaker 116 and microphone array 118; and a high-level controller to provide overall control. Portions of memory 448 (and the instruction therein) may be integrated with processor 444. As used herein, the terms "audio" and "sound" are synonymous and interchangeably. Processor 444 may send pan, tilt, and zoom commands to video cameras 112, which is responsive to the commands as would be appreciated by one of ordinary skill in the relevant arts. As mentioned above, PTZ control may be implemented in the local video conference endpoint, the conference server, or in the receiving video conference endpoint.

In a distributed processor embodiment, controller 408 is a distributed processor, including, but not limited to, (i) an audio processor proximate microphone array 118 to determine audio angle of arrival and distance from a sound source (as discussed above), and (ii) a video conference coder/decoder (i.e., codec). In this embodiment, the audio processor sends determined angles and distances to the video codec. In response, the video codec implements camera FOV control and selection via, e.g., Ethernet on a subnet LAN.

The memory 448 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 448 may comprise one or more computer readable storage media (e.g., a memory device) encoded with software comprising computer executable instructions and when the software is executed (by the processor 444) it is operable to perform the operations described herein. For example, the memory 448 stores or is encoded with instructions for Camera Switch logic 450 to perform operations described herein for automatic switching between main and side camera FOVs based on audio. Camera Switch logic 450 also includes a Voice Detector 452 to classify transduced audio from microphone array 118 as either voice/speech or non-voice/non-speech.

In addition, memory 448 stores data/information 456 used and generated by logic 450 and 452, including information associated with definitions of audio search regions 312M, 312R, and 312L, predetermined audio signal-to-noise ratio (SNR) thresholds, and predetermined peak audio cross-correlation thresholds used as described below.

Figure 5:
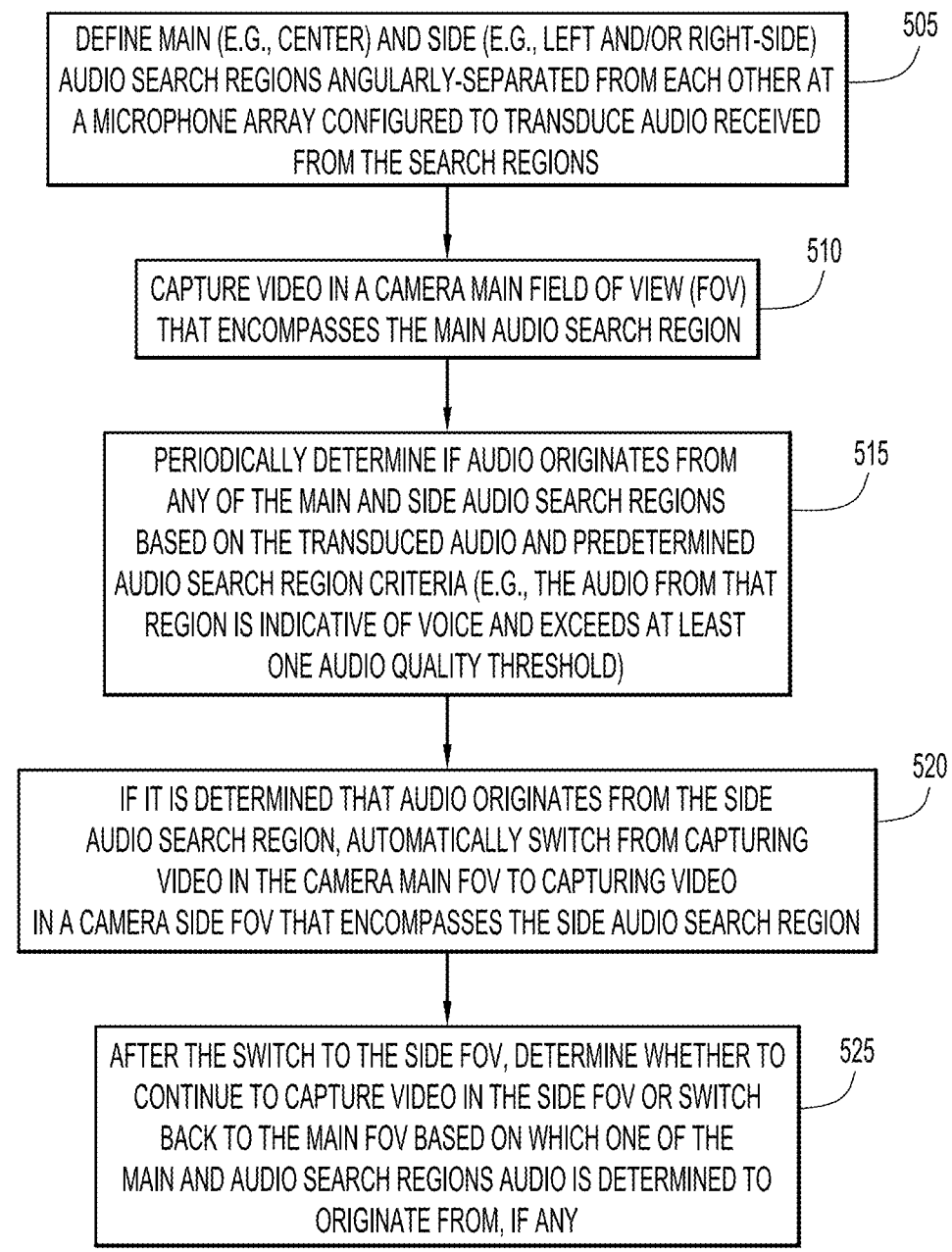
FIG. 5 is a flowchart of an example method of automatic switching between different camera FOVs, including a main FOV, and one or more of a left-side FOV and a right-side FOV, based on audio, according to an example embodiment.

With reference to FIG. 5, there is depicted a flowchart of an example method 500 of automatic switching between main and one or more side camera fields of view based on audio performed by controller 408 (Camera Switch logic 450) in endpoint 104.

Initially, at 505, controller 408 receives parameters that define multiple non-overlapping/angularly-separated audio search regions, e.g., main audio search region 312M, and one or more of right-side audio search region 312R and left-side audio search region 312L. Microphone array 118 transduces audio received at the array into sequential audio frames and provides the transduced audio to controller 408.

Also, controller 408 initializes cameras, i.e., commands the cameras to initial pan, tilt, and zoom settings to establish main camera FOV 212M and one or more of left and right-side FOVs 212R and 212L so as to capture videos of scenes in the corresponding FOVs. As described above, camera FOVs 212M, 212R, and 212L substantially encompass respective ones of audio search regions 312M, 312R, and 312L.

At 510, controller 408 activates main cameras 112A and 112B to capture video in main camera FOV 212M and receives and processes the captured video from the main FOV. For example, controller 408 encodes the captured video and transmits the encoded video to a remote location.

At 515, controller 408 periodically determines if audio originates from any of the main, right-side, or left-side audio search regions 312M, 312R, and 312L based on the transduced audio and predetermined audio search region criteria. To do this, controller 408 (i) performs the "search" described above in connection with FIG. 3 to identify an audio search region from which audio originates, and (ii) qualifies the audio from that audio search region based on the audio search region criteria. The audio search region criteria, if met, indicate that the audio from the audio search region is classified as voice/speech and exceeds one or more audio quality thresholds. The audio quality thresholds will be discussed below in connection with FIG. 6.

At 520, if controller 408 determines that audio originates from right-side audio search region 312R or left-side audio search 312L, the controller declares that audio search region as "active" and automatically switches from capturing video in camera main FOV 212M to capturing video in the camera side FOV that encompasses the active audio search region. Controller 408 encodes the captured video (from the side FOV) and transmits the encoded video (for the side FOV)

instead of encoding and transmitting the video from the main FOV. For example, if controller 408 determines that audio originates from right-side audio search region 312R, the controller (i) deactivates or deselects cameras 112A and 112B so that the controller no longer receives video captured in main FOV 212M, and (ii) activates side camera 112C to capture video in right-side FOV 212R so that the controller begins to receive (and process, e.g., encode and transmit to a remote endpoint) video captured in the right-side FOV. In another embodiment, all of cameras 112A-112C may remain activated and thus continue to capture or record video, but controller 408 selects to receive (and process, e.g., encode and transmit to a remote endpoint) video captured only by side camera 112C (i.e., only from the side FOV).

At 525, after controller 408 switches to the side FOV that encompasses the active side audio search region (e.g., either left-side audio search region 212L or right-side audio region 212R), the controller determines whether to continue to capture video in that side FOV or switch back to main FOV 212M to capture video therein based on which of the main and side audio search regions audio is determined to originate from, if any (note that operation 515 is performed periodically to determine which of the audio search regions coincides with a source of audio).

In one embodiment, after switching to the side FOV at 520, if controller 408 determines that audio no longer originates from either of side audio search regions 312R, 312L, or from main audio search region 312M, controller 408 takes no action, so that video continues to be captured from the side FOV. Continuing to capture the side FOV rather than switching back to the main FOV is preferred in cases where, for example, the participant talking in the side regions 212L or 212R is a lecturer or presenter. It is more important/interesting to capture the presenter than the audience during time of presenter speech silence; for example when he or she is quietly writing on a whiteboard.

In another embodiment, controller 408 automatically switches from capturing video in the side FOV back to capturing video in main FOV 212M after a predetermined period of time (i.e., if controller 408 determines that audio does not originate from any of the audio search regions for a predetermined period of time, the controller switches back to the main FOV).

Figure 6:
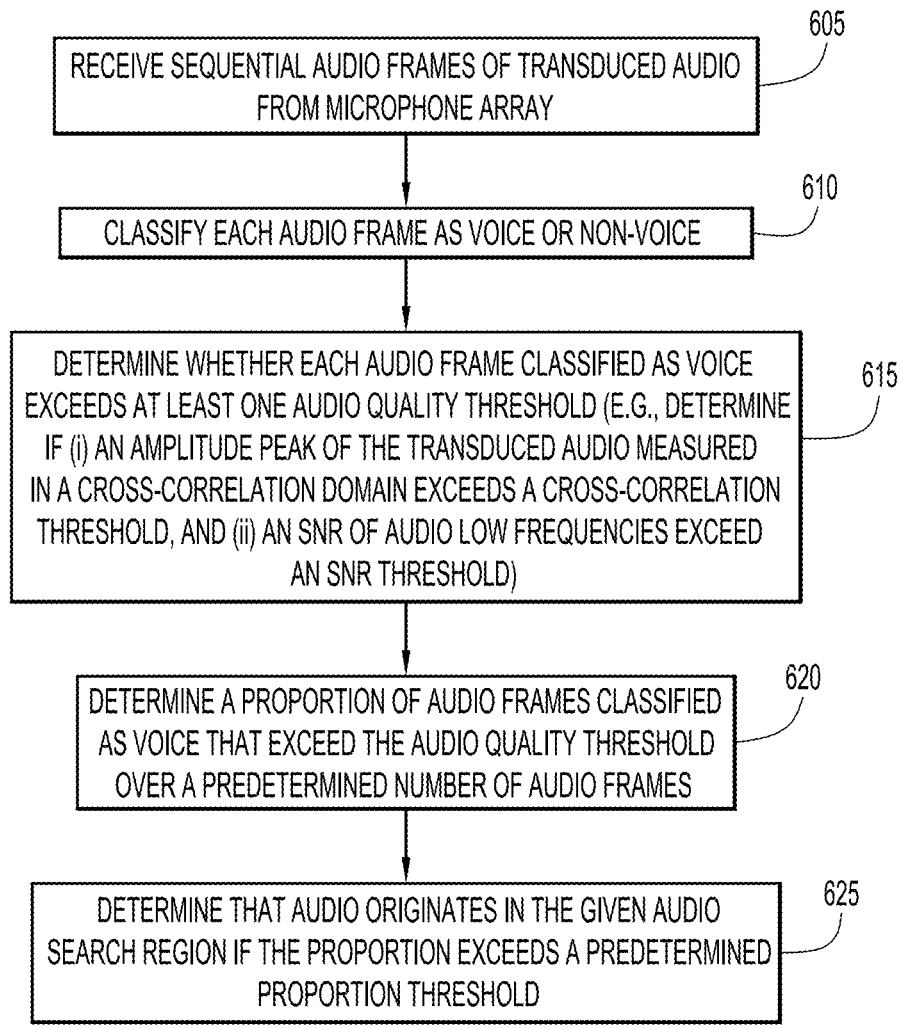
FIG. 6 is a series of example operations expanding on determining whether audio originates in an audio search region from the method of FIG. 6, according to an embodiment.

With reference to FIG. 6, there is depicted a series of example operations 600 expanding on operation 515 to determine whether audio originates in audio search regions 312M, 312R, and 312L based on audio search region criteria.

At 605, controller 408 receives sequential frames of transduced audio from microphone array 118.

At 610, controller 408 classifies each audio frame as voice or non-voice (i.e., as speech or non-speech). Any known or hereafter developed technique to classify audio frames as voice or non-voice may be used.

At 615, controller 408 determines the most likely SA and distance to the sound source of each audio frame and whether each audio frame classified as voice at 605 exceeds one or more predetermined audio quality thresholds for each defined audio search region. For example, controller 408 determines whether an amplitude peak in the given audio frame measured in a cross-correlation domain exceeds a cross-correlation threshold (i.e., a first audio quality threshold). To do this, for example, controller 408 cross-correlates sound transduced by different pairs of individual microphones within the microphone array 118 to produce a cross-correlation level both indicative of a the sound source spatial position inside the conference room 204 and the quality of this position estimate. (One known cross-correlation technique that may be used is referred to as Generalized Cross Correlation with Phase Transform (GCC-PHAT).) Then, controller 408 compares a peak cross-correlation level (the "amplitude peak") against the predetermined cross-correlation threshold.

In addition, the controller 408 determines whether an SNR for relatively low frequencies (e.g., frequencies less than 1 kHz) of a frequency spectrum of the transduced audio that includes both the relatively low frequencies and relatively high frequencies exceeds a low frequency SNR threshold (i.e., a second quality threshold). This test adds a level of robustness because a talking participant standing in a side audio search region relatively close to microphone array 118 will in general generate much higher sound pressure levels and a better SNR for sound frequencies below approximately 1 kHz at the microphone array, in comparison to sound reflections from talking participants in the main audio search region that potentially can arrive at the same sound angle of arrivals (e.g., azimuth angles). Another reason for using frequencies below 1 kHz instead of frequencies above 1 kHz in the evaluation of the SNR is that directivity of speech from a human talker increases significantly above 1 kHz, which renders assumptions about the SNR of the talker at those frequencies unreliable. A suitable low frequency SNR threshold can be calculated based on the distance range for a given audio search region and knowledge of an absolute sound pressure sensitivity of individual microphones in microphone array 118, as is known.

Furthermore, if it is determined that the amplitude peak exceeds the cross-correlation threshold and the SNR exceeds the low frequencies SNR threshold, the controller 408 declares that the one or more quality thresholds are exceeded.

In the embodiment described above, controller 408 determines whether each voice frame exceeds both of first and second quality thresholds. In other embodiments, controller 408 may perform only test (a) or only test (b) and declare that the quality threshold is exceeded when only test (a) is exceeded or only test (b) is exceeded, as appropriate.

At 620, controller 408 determines a proportion of audio frames classified as voice that exceed the predetermined audio quality threshold over a predetermined number of audio frames (for the given audio search region).

At 625, controller 408 determines that voice originates in the given audio search region if the proportion determined at 620 exceeds a predetermined proportion threshold.

In one embodiment for operations 620 and 625, controller 408 calculates a moving average as a percentage of voice frames over the last n audio frames for the given audio search region, and determines that voice originates in the audio search region when the percentage is above a predefined threshold P. The constants n and P can be tuned depending on how aggressive the camera FOV switching is intended to be. In an example, n corresponds to 8 seconds of sequential audio frames and P=20%.

In a simplified embodiment, each of the audio search regions may be defined solely as an angular-range (i.e., without a distance range), in which case the search for audio within an audio search range requires only that a sound angle of arrival be determined and then compared against the respective angular-range.

Techniques presented herein automatically switch between camera FOVs to capture talking participants positioned next to (i.e., on the side of) a video display and a microphone array of a video conference system and positioned in-front of the display and the microphone array based on audio from the participants. Specifically, transduced audio from the microphone array is used to detect when the participant positioned next to the microphone array is talking—even in arrangements in which face detection cannot be used to detect a face of the talking participant. The video conference system automatically switches to a camera having a FOV encompassing a side area in which the talking person is detected in order to capture video of the person. This eliminates a need to manually switch between different cameras. Advantages include: automatic switching between different camera FOVs, thus eliminating the need for manual camera control; capturing a dialog between a presenter standing off to a side of microphone array (and conference display) and an audience positioned in front of the microphone array (and conference display) by dynamically/automatically switching between different camera FOVs that capture scenes of the presenter when talking and the audience when talking as appropriate.

In summary, in one form, a method is provided comprising: defining main and side audio search regions angularly-separated from each other at a microphone array configured to transduce audio received from the search regions; capturing video in a main field of view (FOV) that encompasses the main audio search region; determining over time if audio originates from any of the main and side audio search regions based on the transduced audio and audio search criteria; and if it is determined that audio originates from the side audio search region, automatically switching from capturing video in the main FOV to capturing video in a side FOV that encompasses the side audio search region.

In summary, in another form, an apparatus is provided comprising: a microphone array to transduce audio received at the microphone array; a main camera to capture a video of a main field of view (FOV) that encompasses a main audio search region when activated; a side camera to capture a video of a side FOV that encompasses a side audio search region angularly-separated from the main audio search region relative to the microphone array when activated; and a processor to control the main and side cameras and further configured to: activate the main camera to capture video in the main FOV; determine over time if audio originates from any of the main and side audio search regions based on the transduced audio and audio search criteria; and if it is determined that audio originates from the side audio search region, automatically deactivate the main camera and activate the side camera to capture video in the side FOV.

In summary, in yet another form, a (non-transitory) processor readable medium is provided. The medium stores instructions that, when executed by a processor, cause the processor to: access information that defines main and side audio search regions angularly-separated from each other at a microphone array configured to transduce audio received from the search regions; cause video to be captured in video in a main field of view (FOV) that encompasses the main audio search region; determine over time if audio originates from any of the main and side audio search regions based on the transduced audio and audio search criteria; and if it is determined that audio originates from the side audio search region, automatically switch from causing video to be capture in the main FOV to causing video to be capture in a side FOV that encompasses the side audio search region.

The above description is intended by way of example only. Various modifications and structural changes may be made therein without departing from the scope of the concepts described herein and within the scope and range of equivalents of the claims.

What is claimed is:

1. A method comprising:
defining main and side audio search regions angularly-separated from each other at a microphone array configured to transduce audio received from the search regions;
capturing video in a main field of view (FOV) that encompasses the main audio search region;
determining over time if audio originates from any of the main and side audio search regions based on the transduced audio and audio search criteria;
if it is determined that audio originates from the side audio search region, automatically switching from capturing video in the main FOV to capturing video in a side FOV that encompasses the side audio search region; and
after switching to the side FOV, if it is determined that audio does not originate from either the side audio search region or the main audio search region, continuing capturing video in the side FOV.

2. The method of claim 1, further comprising:
after switching to the side FOV, if it is determined that audio does not originate from the side audio search region and does originate from the main audio search region, switching from capturing video in the side FOV to capturing video in the main FOV.

3. The method of claim 1, further comprising:
after switching to the side FOV, if it is determined that audio does not originate from either the side audio search region or the main audio search region, automatically switching from capturing the video in the side FOV to the main FOV after a predetermined period of time.

4. The method of claim 1, wherein the defining includes:
defining the main audio search region so as to (i) subtend a main angular-range centered about a main axis that extends normally to a plane of the microphone array, and (ii) extend over a main range of distances from the microphone array; and
defining the side audio search region so as to (iii) subtend a side angular-range centered about a side axis angularly-separated from the main axis, and (iv) extend over a side range of distances from the microphone array.

5. The method of claim 4, wherein the main angular-range is approximately 120 degrees centered about the main axis and the side angular-range extends from 75 degrees to 90 degrees on one of a left-side of the main axis and a right-side of the main axis.

6. The method of claim 1, wherein:
the defining includes defining a left-side audio search region and a right-side audio search region each angularly-separated from the main audio search region on a left-side of the main audio search region, respectively;
the determining includes determining if audio originates from either the left-side audio search region or the right-side audio search region; and
if it is determined that audio originates from either the left-side audio search region or the right-side audio search region, automatically switching from capturing video in the main side FOV to capturing video in either a left-side FOV that encompasses the left-side audio search region or a right-side FOV that encompasses the right-side audio search region, respectively.

7. The method of claim 1, further comprising generating sequential audio frames of the transduced audio, wherein the determining includes classifying each frame as voice or non-voice and, for each audio search region:

determining whether each audio frame classified as voice exceeds an audio quality threshold for the given audio search region;

determining a proportion of audio frames classified as voice that exceed the audio quality threshold over a predetermined number of audio frames for the given audio search region; and determining that voice originates in the given audio search region if the proportion exceeds a predetermined proportion threshold.

8. The method of claim 7, wherein the determining whether each audio frame classified as voice exceeds an audio quality threshold includes determining whether an amplitude peak measured in a cross-correlation domain, created by combining cross-correlations from multiple microphone pairs in the microphone array, exceeds a cross-correlation threshold.

9. The method of claim 8, wherein the determining whether each audio frame classified as voice exceeds an audio quality threshold further includes:

determining whether a signal-to-noise ratio (SNR) for low frequencies of an audio frequency spectrum of the transduced audio that includes both the low frequencies and high frequencies exceeds a low frequencies SNR threshold; and if it is determined that the amplitude peak exceeds the cross-correlation threshold and the SNR exceeds the low frequencies SNR threshold, declaring that the quality threshold is exceeded.

10. The method of claim 1, wherein:

the capturing video in the main FOV includes encoding the video captured in the main FOV and transmitting the encoded video for the main FOV; and the automatically switching from capturing video in the main FOV to capturing video in a side FOV includes encoding the video captured in the side FOV and transmitting the encoded video for the side FOV instead of encoding and transmitting the video captured in the main FOV.

11. An apparatus, comprising:

a microphone array to transduce audio received at the microphone array;

a main camera to capture a video of a main field of view (FOV) that encompasses a main audio search region when activated;

a side camera to capture a video of a side FOV that encompasses a side audio search region angularly-separated from the main audio search region relative to the microphone array when activated; and a processor to control the main and side cameras, to:
activate the main camera to capture video in the main FOV;
determine over time if audio originates from any of the main and side audio search regions based on the transduced audio and audio search criteria;
if it is determined that audio originates from the side audio search region, automatically deactivate the main camera and activate the side camera to capture video in the side FOV; and
after the side camera is activated, if it is determined that audio does not originate from either the side audio search region or the main audio search region for a predetermined period of time, deactivate the side camera and activate the main camera to capture video in the main FOV after the predetermined period of time.

12. The apparatus of claim 11, wherein the processor:
after the side camera is activated, if it is determined that audio does not originate from either the side audio search region or the main audio search region, continues to keep the side camera activated so as to capture video in the side FOV.

13. The apparatus of claim 12, wherein the processor:
after the side camera is activated, if it is determined that audio originates from the main audio search region instead of the side audio search region, deactivates the side camera and activate the main camera to capture video in the main FOV.

14. The apparatus of claim 11, wherein:
the main audio search region is configured to (i) subtend a main angular-range centered about a main axis that extends normally to a plane of the microphone array, and (ii) extend over a main range of distances from the microphone array; and
the side audio search region is configured to (iii) subtend a side angular-range centered about a side axis angularly-separated from the main axis, and (iv) extend over a side range of distances from the microphone array.

15. The apparatus of claim 14, wherein the main angular-range is approximately 120 degrees centered about the main axis and the side angular-range extends from 75 degrees to 90 degrees on one of a left-side of the main axis and a right-side of the main axis.

16. The apparatus of claim 11, wherein the processor receives sequential audio frames of the transduced audio, classify each of the audio frames as voice or non-voice, and for each audio search region:

determines whether each audio frame classified as voice exceeds an audio quality threshold for the given audio search region;

determines a proportion of audio frames classified as voice that exceed the audio quality threshold over a predetermined number of audio frames for the given audio search region; and determines that voice originates in the given audio search region if the proportion exceeds a predetermined proportion threshold.

17. The apparatus of claim 16, wherein the processor determines whether each audio frame classified as voice exceeds an audio quality threshold by determining whether an amplitude peak measured in a cross-correlation domain, created by combining cross-correlations from multiple microphone pairs in the microphone array, exceeds a cross-correlation threshold.

18. The apparatus of claim 17, wherein the processor determines whether each audio frame classified as voice exceeds an audio quality threshold by:

determining whether a signal-to-noise ratio (SNR) for low frequencies of an audio frequency spectrum of the transduced audio that includes both the low frequencies and high frequencies exceeds a low frequencies SNR threshold; and if it is determined that the amplitude peak exceeds the cross-correlation threshold and the SNR exceeds the low frequencies SNR threshold, declaring that the quality threshold is exceeded.

19. A non-transitory processor readable medium storing instructions that, when executed by a processor, cause the processor to:

access information that defines main and side audio search regions angularly-separated from each other at a microphone array configured to transduce audio received from the search regions;

cause video to be captured in video in a main field of view (FOV) that encompasses the main audio search region;
determine over time if audio originates from any of the main and side audio search regions based on the transduced audio and audio search criteria;
if it is determined that audio originates from the side audio search region, automatically switch from causing video to be capture in the main FOV to causing video to be capture in a side FOV that encompasses the side audio search region; and
after switching to the side FOV, if it is determined that audio does not originate from either the side audio search region or the main audio search region, continue to cause the video to be captured in the side FOV.

20. The processor readable medium of claim 19, further comprising instructions to cause the processor to:
after switching to the side FOV, if it is determined that audio does not originate from the side audio search region and does originate from the main audio search region, switch from causing the video to be capture in the side FOV to causing the video to be captured in the main FOV.

21. The processor readable medium of claim 19, further comprising instructions to cause the processor to:
after switching to the side FOV, if it is determined that audio does not originate from either the side audio search region or the main audio search region, automatically switch from causing the video to be capture in the side FOV to causing the video to be captured in the main FOV after a predetermined period of time.

22. The processor readable medium of claim 19, wherein the information that defines the main and side audio search regions includes information that:
defines the main audio search region so as to (i) subtend a main angular-range centered about a main axis that extends normally to a plane of the microphone array, and (ii) extend over a main range of distances from the microphone array; and
defines the side audio search region so as to (iii) subtend a side angular-range centered about a side axis angularly-separated from the main axis, and (iv) extend over a side range of distances from the microphone array.

\* \* \* \* \*